(12) United States Patent
Roberts

(10) Patent No.: US 7,190,350 B2
(45) Date of Patent: Mar. 13, 2007

(54) TOUCH SCREEN WITH ROTATIONALLY ISOLATED FORCE SENSOR

(75) Inventor: Jerry B. Roberts, Arlington, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 665 days.

(21) Appl. No.: 10/121,516

(22) Filed: Apr. 12, 2002

(65) Prior Publication Data

US 2002/0163509 A1    Nov. 7, 2002

Related U.S. Application Data

(63) Continuation-in-part of application No. 09/835,040, filed on Apr. 13, 2001.

(51) Int. Cl.
G09G 5/00 (2006.01)
(52) U.S. Cl. .................... 345/173; 178/18.01
(58) Field of Classification Search ............... 345/174, 345/173, 177, 178, 158; 178/18.01, 18.03, 178/19.01, 19.04; 341/33; 382/116, 119, 382/121
See application file for complete search history.

(56) References Cited

U.S. PATENT DOCUMENTS

| | | | |
|---|---|---|---|
| 3,657,475 A | 4/1972 | Peronneau et al. | |
| 4,089,036 A | 5/1978 | Geronime | |
| 4,121,049 A | 10/1978 | Roeber | |
| 4,293,734 A * | 10/1981 | Pepper, Jr. ............... | 178/18.01 |
| 4,340,777 A | 7/1982 | DeCosta et al. | |
| 4,355,202 A | 10/1982 | DeCosta et al. | |
| 4,389,711 A | 6/1983 | Hotta et al. | |
| 4,484,179 A | 11/1984 | Kasday | |
| 4,495,434 A | 1/1985 | Diepers et al. | |
| 4,511,760 A | 4/1985 | Garwin et al. | |
| 4,542,375 A | 9/1985 | Alles et al. | |
| 4,550,384 A | 10/1985 | Kimura | |
| 4,558,757 A | 12/1985 | Mori et al. | |
| 4,675,569 A | 6/1987 | Bowman et al. | |
| 4,697,049 A | 9/1987 | Peemoller et al. | |
| 4,745,565 A | 5/1988 | Garwin et al. | |
| 4,771,277 A | 9/1988 | Barbee et al. | |
| 4,775,765 A | 10/1988 | Kimura et al. | |
| 4,816,811 A | 3/1989 | Bogatin et al. | |
| 4,875,378 A | 10/1989 | Yamazaki et al. | |

(Continued)

FOREIGN PATENT DOCUMENTS

DE          92 03 286.9          6/1992

(Continued)

OTHER PUBLICATIONS

"Force Concentrator For Touch Sensitive Panel Using Snap-Action Switches", IBM Technical Disclosure Bulletin #NN7606238, vol. 19, Jun. 1976.

(Continued)

Primary Examiner—Richard Hjerpe
Assistant Examiner—Abbas Abdulselam
(74) Attorney, Agent, or Firm—Robert J. Pechman

(57) ABSTRACT

A touch screen uses one or more force sensors to determine location of the touch on the screen. Bending or twisting of the touch screen overlay, or of the support structure upon which the touch screen is mounted, may result in the detection of undesirable forces by force sensors. These undesirable forces may distort the measurement of the location of the touch on the screen. The force sensor is arranged to reduce the effects of flexure on the determination of the location of the touch. For example, a rotational softener, such as a rotational bearing or a pliable material may be included with the force sensor.

51 Claims, 8 Drawing Sheets

U.S. PATENT DOCUMENTS

| | | | |
|---|---|---|---|
| 4,893,115 A | | 1/1990 | Blanchard |
| 4,918,262 A | | 4/1990 | Flowers et al. |
| 4,983,787 A | | 1/1991 | Kunikane |
| 5,038,142 A | | 8/1991 | Flowers et al. |
| 5,072,076 A | | 12/1991 | Camp, Jr. |
| 5,125,270 A | * | 6/1992 | Kovacevic ............... 73/379.02 |
| 5,241,308 A | * | 8/1993 | Young .......................... 341/34 |
| 5,376,948 A | | 12/1994 | Roberts |
| 5,386,442 A | * | 1/1995 | Diaz et al. .................. 376/245 |
| 5,541,372 A | | 7/1996 | Baller et al. |
| 5,543,588 A | | 8/1996 | Bisset et al. |
| 5,563,632 A | | 10/1996 | Roberts |
| 5,708,460 A | * | 1/1998 | Young et al. ............... 345/173 |
| 5,714,694 A | | 2/1998 | Diessner |
| 5,854,625 A | | 12/1998 | Frisch et al. |
| 5,917,165 A | * | 6/1999 | Platt et al. .................. 200/600 |
| 6,108,211 A | | 8/2000 | Diessner |
| 6,529,122 B1 | * | 3/2003 | Magnussen et al. ..... 340/407.2 |
| 6,686,546 B2 | * | 2/2004 | Chiu ....................... 178/18.01 |
| 6,781,579 B2 | * | 8/2004 | Huang et al. ............... 345/173 |

FOREIGN PATENT DOCUMENTS

| | | |
|---|---|---|
| EP | 0531815 | 3/1993 |
| GB | 2 180 342 | 3/1987 |
| JP | 61148522 | 7/1986 |

OTHER PUBLICATIONS

"Touch-Sensitive Pancake," IBM Technical Disclosure Bulletin #88A61790, Oct. 1998.

U.S. Appl. No. 09/835,049, filed Apr. 13, 2001, Tangential Force Control in a Touch Location Device.

U.S. Appl. No. 09/835,040, filed Apr. 13, 2001, Method and Apparatus for Force-Based Touch Input.

* cited by examiner

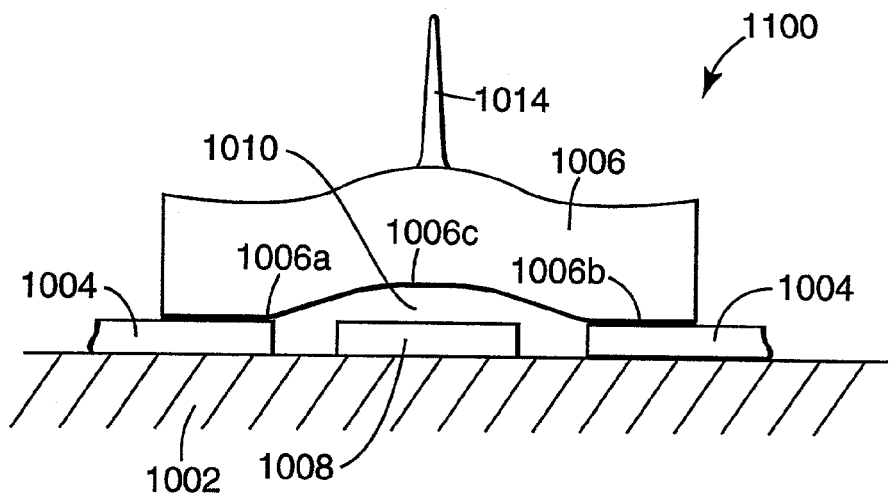
FIG. 10
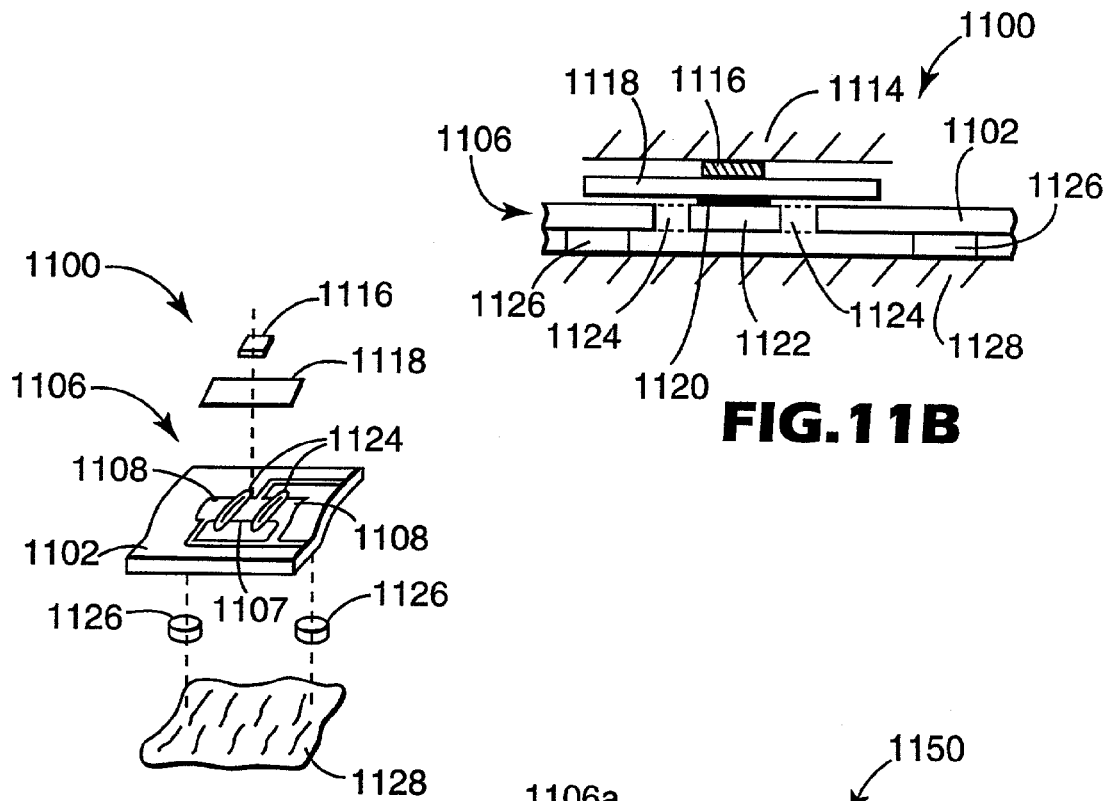
FIG. 11B
FIG. 11A
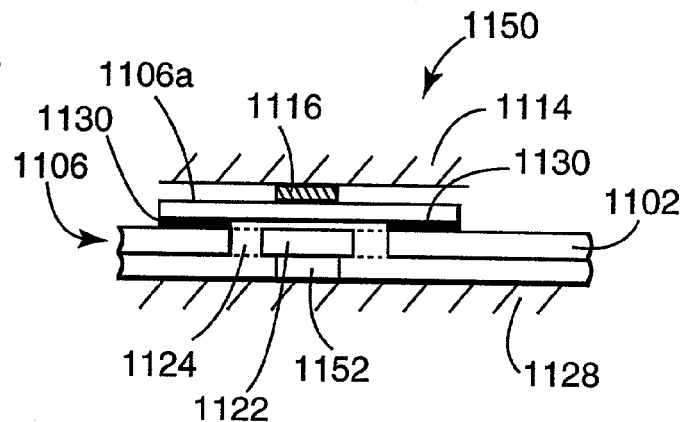
FIG. 11C

TOUCH SCREEN WITH ROTATIONALLY ISOLATED FORCE SENSOR

RELATED APPLICATIONS

This application is a continuation-in-part of U.S. application Ser. No. 09/835,040, filed on Apr. 13, 2001, which is incorporated herein by reference.

FIELD OF THE INVENTION

The present invention is directed generally to touch screens and more particularly to touch screens that detect the position of a touch based on a measurement of the touch forces applied to the screen.

BACKGROUND

A touch screen offers a simple, intuitive interface for a computer or other data processing device. Rather than using a keyboard for data entry, a user can transfer information through a touch screen by touching an icon or by writing or drawing on a screen. Touch screens are used in a variety of information processing applications. Transparent touch screens, used over an information display such as a liquid crystal display (LCD) or cathode ray tube (CRT), are particularly useful for applications such as cellphones, personal data assistants (PDAs), and handheld or laptop computers.

Various methods have been used to determine touch location, including capacitive, resistive, acoustic and infrared techniques. Touch location may also be determined by sensing the force of the touch through force sensors coupled to a touch surface. Touch screens that operate by sensing touch force have several advantages over the other technologies mentioned above. Electrically based approaches, such as resistive and capacitive approaches, require a complex touch surface overlay that uses special materials and multiple layers to ensure good electrical properties across the screen while also maintaining good optical transmission through the screen. The overlay of a force-based touch screen, on the other hand, may be formed from a simple, single sheet of material. Further, force sensors do not rely on a lossy electrical connection to ground, as required by a capacitive touch screen, and can be operated by a finger touch, gloved hand, fingernail or other nonconductive touch instrument. Unlike surface acoustic wave technology, force sensors are relatively immune to accumulations of dirt, dust, or liquids on the touch surface. Finally, a force sensor is less likely to detect a close encounter as an actual touch, which is a common problem with infrared and capacitive touch screens.

Forces detected by touch screen force sensors reflect a variety of static and dynamic factors in addition to the touch force. These factors may be considered noise sources with respect to the touch signal. Noise may be introduced through the touch screen electronics, or it may be mechanical in nature. Electrical noise may be introduced, for example, in the sensor, amplifier, data conversion or signal processing stages. Mechanical noise may arise from various mechanical effects, such as vibration, flexure, movement, and the application of forces that are non-perpendicular to the touch screen. In addition, the touch screen force sensors may be affected by the weight of the touch surface and preloading forces applied to the force sensors during manufacture.

SUMMARY OF THE INVENTION

Generally, the present invention is directed to an approach to reduce the effects of flexure on the determination of the location of the touch. Bending or twisting of the touch screen overlay, or of the support structure upon which the touch screen is mounted, may produce a moment that is applied to the force sensors, which may then result in the detection of undesirable forces by force sensors. These undesirable forces may distort the measurement of the location of the touch on the screen, and so the effects of bending or twisting may lead to errors in the position determination.

According to the present invention, where the touch screen overlay or the mounting support is not perfectly rigid, a moment may be applied to the force sensor. The force sensor is decoupled from the moment so that the undesirable forces arising from the moment are not detected by the force sensor. An advantage of this approach is that, unlike other approaches, the mounting support and the overlay do not have to be perfectly rigid, but may be flexible. Thus, the overlay and support may be lighter and thinner, without leading to errors in the measurement of the touch location.

One particular embodiment of the invention is directed to a touch sensitive device that has a flexible touch member movable in response to an applied force and a support structure. A plurality of force sensor units are coupled between the support structure and the touch member to measure a signal indicative of a force passing through sensor regions of the device and arising from the applied force. At least one of the sensor units is arranged so that twisting of one of the touch member and the support structure passes substantially no moment through the sensor unit.

Another embodiment of the invention is directed to a method of locating the position of a touch force arising from a touch on a touch screen. The method includes measuring a signal indicative of a force passing from a flexible touch surface through a force sensor unit while isolating a twisting moment of one of the touch surface and a support structure from the other of the touch surface and the support structure.

Another embodiment of the invention is directed to a touch sensitive device that has a flexible touch member and means for measuring a signal indicative of a force passing through a sensor region due to a touch force applied to the touch member while isolating a twisting moment of one of the touch member and a support structure from the other of the touch member and the support structure.

Another embodiment of the invention is directed to a touch sensitive device that has a flexible touch member movable in response to an applied force, and a support structure. Sensor units are coupled between the support structure and the touch member to measure a signal indicative of a force passing through sensor regions and arising from the applied force. The same relative pattern of internal stresses is developed in a first sensor unit of the sensor units, irrespective of touch location upon the touch member.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 10 schematically illustrates another embodiment of a capacitive force sensor that includes rotational softening according to the present invention; and FIGS. 11A–11C schematically illustrate another embodiment of a capacitive force sensor that includes rotational softening according to the present invention.

Figure 1:
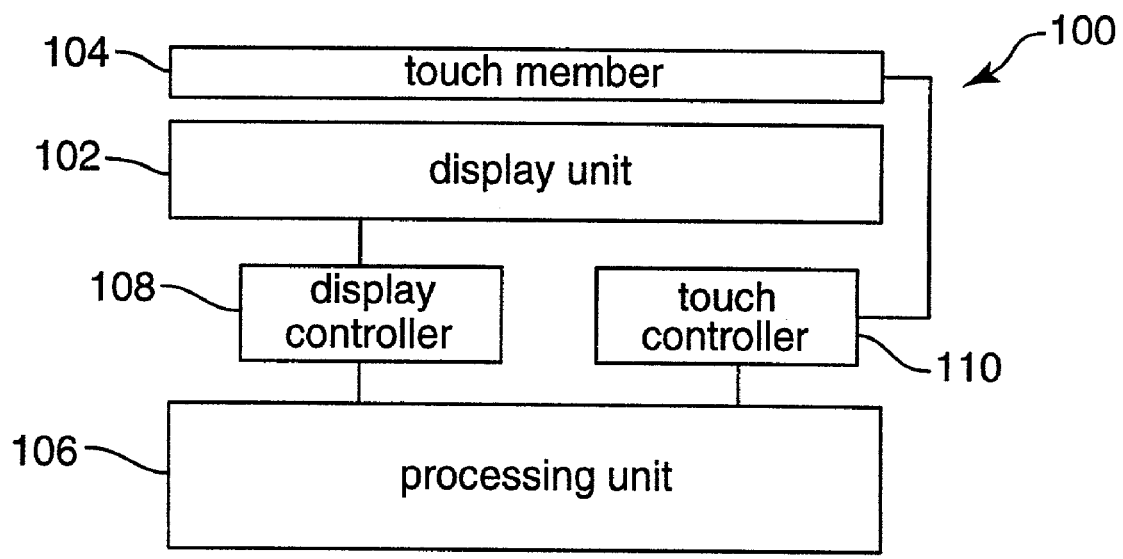
FIG. 1 shows a block schematic of a display device according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to touch sensing techniques and is believed to be particularly useful for reducing the deleterious effects that arise when the touch panel overlay or the structure upon which the touch panel is mounted flex. For example, the touch screen of the present invention may be used in a desktop, handheld or laptop computer system, a point-of-sale terminal, personal data assistant (PDA), or a cell phone. Although described in combination with a microprocessor-based system, the touch screen device of the present invention may be combined with any logic-based system, if desired. The present invention is directed to determining a touch location on a touch screen. A touch signal representing the force of a touch acting on the touch screen is produced by one or more touch sensors located proximate to a touch surface of the touch screen. A touch signal may be derived from a single sensor, or by combining component touch signals from two or more force sensors. Determination of the touch location requires analysis of the component force signals produced by the touch screen sensors.

In particular, the present invention is directed to a touch screen that determines the position of the touch based on a measurement of the force applied to the screen. Screen overlays in such touch screens may appear to the user to be quite rigid, but yet may be flexible compared to the stiffness of the sensors supporting them. In particular, the overlay may be flexible with respect to twisting motions of the sensors. In other words, a sensor may restrain the flexing of the overlay in its immediate vicinity, while transmitting the moment associated with this restraining action through to the support. Conversely, any flexure of the support tending to twist the sensor very slightly from its normal perpendicular alignment may force the overlay locally to flex and follow. This, too, may be accompanied by transmission of significant moment through the sensor. These moments may create a problem in that they lead to additional perpendicular forces in the sensors to maintain equilibrium. This distorts the expected perpendicular touch force detected by the sensor, and may result in a mis-reporting the position of the touch.

Prior approaches to reducing these problems have tended to emphasize a stiff overlay and/or stiff sensors. The present invention, in contrast, is directed to the use of couplings between the overlay and the sensor that are termed "rotationally soft", so that the moments resulting from the flexing overlay are not applied to the sensor. This reduces both the error resulting from a direct sensor response to the moment, and also reduces the spurious perpendicular forces just described. The problems of mis-reporting the position of the touch may, therefore, be reduced.

The basic components of a device 100 having a touch display are illustrated in FIG. 1. A display unit 102, for example a liquid crystal display (LCD) or cathode ray tube (CRT), is disposed below a touch member 104. The display unit 102 is coupled to a processing unit 106 and displays information received from the processing unit via a display controller 108. The display controller 108 may be part of the processing unit 106. The location of a touch on the touch member 104 is determined by the touch screen controller 110, which may be part of the processing unit 106. Therefore, the processing unit 106 may be enabled to determine the position of a touch on the touch member 104 relative to an image displayed on the display unit 102, and determine the meaning of the user's input. It is important that the location of the touch on the touch member 104 be determined with as little error as is needed to ensure that the processing unit 106 receives the desired information from the user.

One particular type of touch member 104 includes an overlay that the user presses on, and a number of sensors to determine the resulting force at various positions on the overlay. The location of the touch may then be determined by an analysis of the sensed forces. Where the touch screen is rectangular in shape, there are often four sensors, one at each corner, to measure the applied forces. In some embodiments, the force sensors may be behind and supporting the display itself, which acts as the touch member. In such a case, the overlay is replaced by the display panel itself, and the display panel transmits the applied forces to the force sensors.

Force sensors typically detect some movement that occurs in response to the applied force. For example, the elements of a strain gauge stretch under application of a force, and the electrical characteristics of a piezoelectric or piezoresistive sensor change when the sensor element is compressed or stretched. Furthermore, in a capacitive sensor element, one capacitor plate is moved in relation to another capacitor plate upon application of a force. Therefore, while a sensor may be referred to as a displacement sensor, it will be appreciated that a measurement of displacement may be used to provide an estimate of the applied force that resulted in the measured displacement, even if the magnitude of the displacement itself is small.

Figure 2:
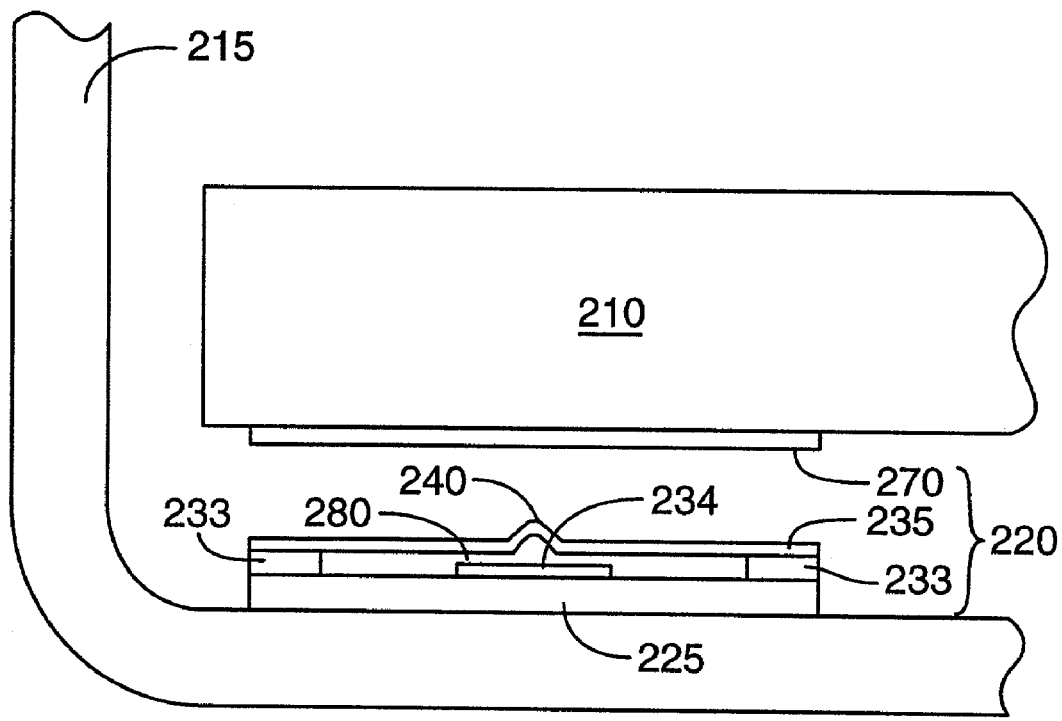
FIG. 2 schematically illustrates a partial cross-section through a force-based touch sensor, according to an embodiment of the present invention.

One embodiment of a force sensor appropriate for use in touch screen applications is described in U.S. patent application Ser. No. 09/835,040, filed on Apr. 13, 2001, which is hereby incorporated by reference. The force sensor is appropriate for use with a liquid crystal display (LCD), cathode ray tube (CRT) or other transparent display, and is schematically illustrated in FIG. 2. In this particular embodiment, the sensor measures the applied force based on the change of capacitance of a capacitive element.

A touch member 210, or overlay, is located within a structure or housing 215. This structure or housing 215 may be provided with a large central aperture through which the display may be viewed. Further, the overlay 210 may be transparent to allow such viewing. If desired, the undersurface of the housing 215 may be seated directly against the surface of such a display, over the border surrounding its active area. In another embodiment, as mentioned above, the overlay may be replaced by a structure including a display unit, such as an LCD.

A capacitive sensor 220 may be positioned between the overlay 210 and the housing 215. An interconnect 225, with attachment lands 233, may be coupled to the housing 215 by soldering, cementing, or by other methods. A conductive area forms a first conductive element 234 on the interconnect 225. A second conductive element 235 with a central protrusion 240, for example a dimple, may be attached to the lands 233 of the interconnect 225 by soldering, for example. A small gap 280 is formed between the first conductive element 234 and the second conductive element 235, either by the shape of the second conductive element 235, or by the process of attaching the second conductive element 235 to the interconnect 225. The width of the gap 280 may be approximately 25 μm, for example. A capacitor is formed by the conductive elements 234, 235 separated by the gap 280.

An optional bearing surface 270 may be interposed between the touch panel 210 and the second conductive element 235. This may protect the overlay 210 from indentation or from damage by the protrusion 240, especially in cases where the overlay is made of softer material. The bearing surface 270 may also mount to the overlay 210 through a thin layer (not shown) of elastomer or of highly pliable adhesive, thereby providing a lateral softening function. It will be appreciated that, in normal operation, the overlay 210 or bearing surface 270 is in contact with the protrusion 240: these elements are shown separated only for clarity in the illustration.

The second conductive element 235 combines the functions of a spring and a capacitor plate. As a perpendicular force is applied to the surface of the touch panel 210, the second conductive element 235 flexes, decreasing the width of the gap 280 and increasing the capacitance of the sensor 220. This change in capacitance may be measured and related to the force applied to the touch panel 210. Although a touch screen using capacitive force sensors is described, other types of force sensors may be used in a similar manner, including, for example, piezoelectric sensors and strain gauge sensors.

One of the advantages of a force-based touch screen is that the number of optically distinct layers positioned between the display unit and the user is low. Typically, the overlay positioned over the display unit is a single layer of glass or relatively stiff polymer, for example polycarbonate or the like, which may be chosen for suitable optical qualities. This contrasts with other types of touch screen, such as resistive or capacitive touch screens, that require several, potentially optically lossy, layers over the display unit. The electrically conductive thin films required in resistive or capacitive touch screens typically have a high index of refraction, leading to increased reflective losses at the interface. This is a particular problem in resistive screens where there are additional solid/air interfaces and where antireflection coatings are not useful, since the conductive layers must be able to make physical contact. A screen overlay for a force-based touch screen, however, has only its upper and lower surfaces; these may be treated to reduce reflective losses and to reduce glare. For example, the overlay may be provided with matte surfaces to reduce specular reflection, and/or may be provided with anti-reflection coatings to reduce reflective losses.

Thin overlays, although more desirable, are also more flexible than thicker ones. The present invention contrasts with previous approaches, which have assumed that the overlay is perfectly rigid, or is nearly so. Overlay flexibility is desirable for reasons other than just size and weight. For example, where the device underlying the touch screen is flexible, any corner-to-corner twisting of the underlying device results in twisting of the display. This tends to force one diagonally opposed pair of sensors upward against the overlay, while drawing the other pair downward. A flexible overlay accommodates this torsional distortion of the underlying device by gently following it, without damage and with reduced adverse effects.

Failure to bend in this manner, due to an excessively rigid overlay, may lead to certain problems. There are problems with many possible sensor arrangements, but only the case of four contact-loaded corner sensors is considered here. With increasing torsional force, displacement will at first be prevented by the rigidity of the overlay, and all torsional force will appear superimposed upon the perpendicular components that the sensors measure. These forces may often be larger than typical touch forces, and may fluctuate. These forces may take the force sensors out of their useful range. With further increase in the torsional force, one of the sensors may unload completely, with space opening up between the unloaded sensor and the overlay. This space is associated with the support structure or bezel rising or falling with respect to the edge of the overlay, and thus may lead to large parasitic forces through a seal, mounting, or any other kind of attachment between the overlay edge and surrounding structures. These effects may result in false readings of touch position. We return now to considering how flexure may lead to moment transmission, how moment transmission may lead to measurement error, and how both may be forestalled with rotational softening.

A moment may be applied to a sensor where the underlying support flexes. This may result, for example, from the application of modest touch forces upon a practicably light and inexpensive support structure. The underlying support structure may also flex upon the application of external forces, unrelated to a deliberate touch on the overlay surface.

For example, a user may rest his or her hand on the corner of the bezel, or a kiosk device having a touch screen may be located on a floor that flexes. As with moments passing through the sensors from overlay flexure, such moments occasioned by support flexure also require spurious perpendicular forces to maintain equilibrium.

Beyond these errors, some sensors respond directly to the application of a moment, leading to further error. This results from a less than uniform response to the perpendicular forces passing through different portions of the sensor.

Rotational softening, in other words the decoupling of rotational forces between the overlay and the sensor, may be used to reduce erroneous force readings caused by either of the above effects. Rotational softening permits the same relative pattern of internal stresses to be developed in the sensor, irrespective of a where the touch is located on the touch member.

Returning once more to FIG. 2, the protrusion 240 presents a small contact area for the sensor 220 on the bearing surface 270. Furthermore, if the protrusion 240 is not attached to the bearing surface 270, but the bearing surface 270 merely rests on the protrusion 240, then no moment is transferred to the sensor 220 when the overlay 210 twists. The sensor 220 may still sense a perpendicular force when the overlay twists, however. This rotational decoupling between the overlay and the force sensor is explained further below.

Sensors may also respond to the application of a shear. Shear responsiveness may be expressed as saying that the sensor's axis of sensitivity is not perpendicular to its mounting plane. In systems without divided force paths, location errors are proportional to the product of the tangential force times the sine of the error angle by which the axis of sensitivity deviates from the normal to the touch plane. The touch plane is the plane of the overlay, or touch member, that is touched by the user. Divided force paths are paths that transmit forces parallel and perpendicular to the touch plane, see U.S. patent application Ser. No. 09/835,049, entitled "Tangential Force Control In A Touch Location Device" and incorporated herein by reference. This error angle may be compounded by any errors in mounting the sensor itself, for example where the mounting surface is not parallel to the touch plane or where the sensor is mounted using a layer of adhesive whose thickness is non-uniform.

Rotational softening may not only reduce the exposure of a sensor to a moment resulting from flexure of the overlay or the mounting surface, but may also reduce incidental sensor moments resulting from shear. This may be achieved by taking the center of rotation for the rotational softening as close as possible to the center of the sensor itself.

The use of divided force paths is discussed in U.S. patent application Ser. No. 09/835,049. Divided force paths reduce the application of tangential forces to the sensor. Tangential forces are parallel to the touch plane. Where divided force paths are implemented, and the tangential force through the sensors may be ignored, there is also no twisting moment from the tangential forces acting about a rotational softening center which is above or below the sensor. In such a situation, rotational softening may be useful for reducing moments that are applied directly to the sensor due to flexure of the touch panel overlay. The rotational softening may be implemented at any convenient height with respect to either the sensor or touch plane. Where there is no lateral softening, then it may be advantageous to provide the rotational softening in the plane of the touch plane to reduce the adverse effects of lateral forces.

Figure 3A:
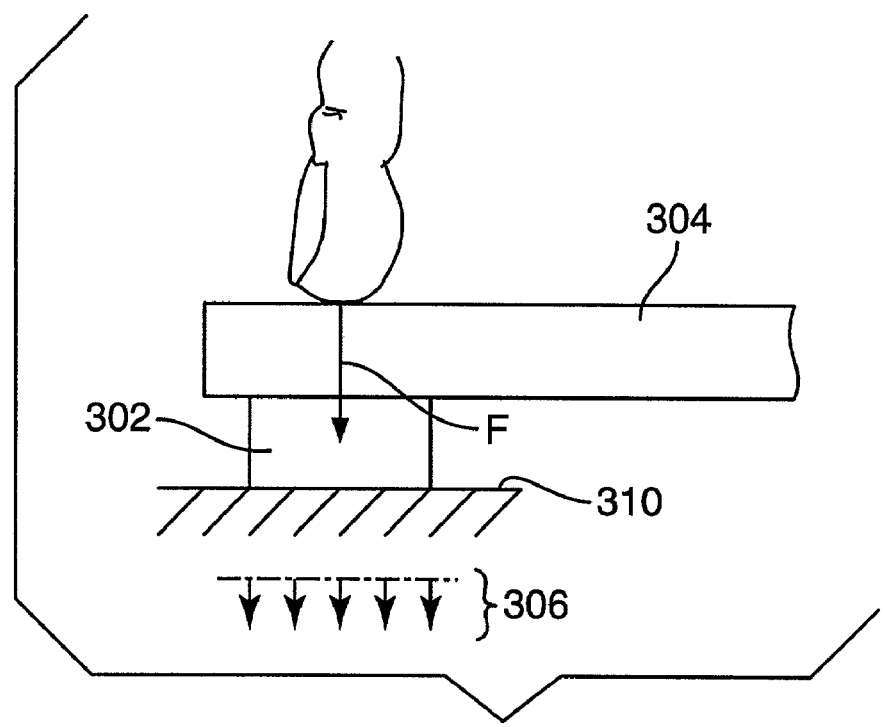
FIGS. 3A and 3B schematically illustrate the distribution of forces on a force sensor when the touch screen is touched at different places.
Figure 3B:
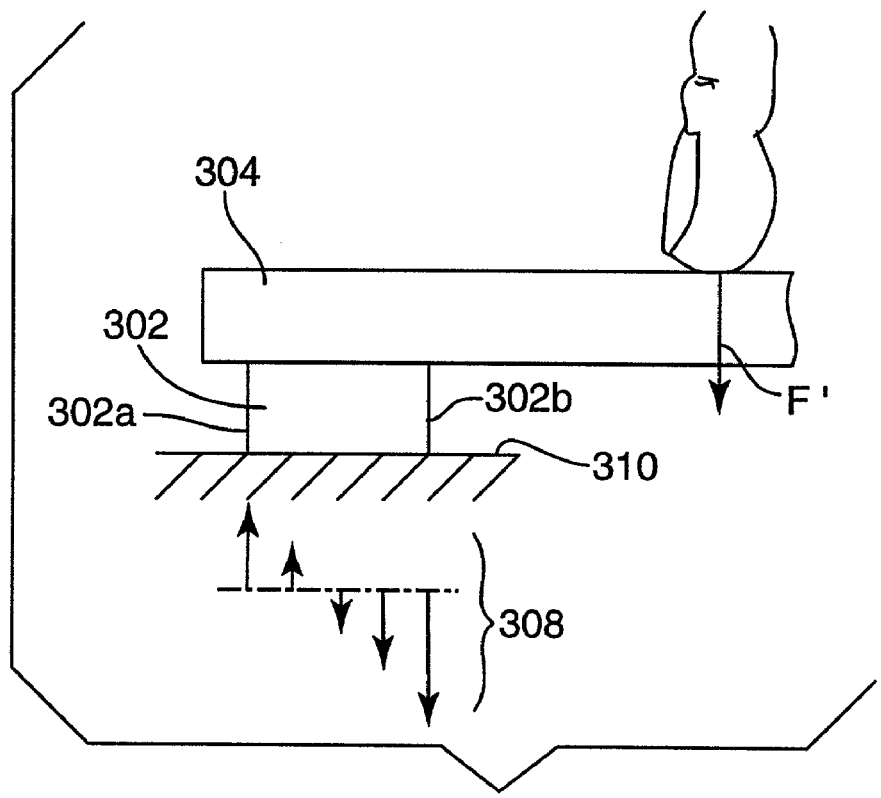

One way in which a moment may be applied to a sensor is described with respect to FIGS. 3A and 3B, which show the force distributions that may develop in a sensor, particularly where the sensor 302 is rotationally stiffer than the overlay 304. As is seen in FIG. 3A, the force, F, applied directly over a sensor may lead to an even stress distribution 306. In FIG. 3B, the force, F', is applied to the overlay 304 at a point that is to the side of the sensor, resulting in a stress distribution 308 that is uneven. An opposing sensor (not shown) supports the other edge of the overlay 304. Although the touch is more distant from this opposing sensor than from sensor 302, a fraction of the touch force F' may pass through the opposing sensor. In the illustrated case, however, the flexibility of the overlay 304 has had the effect of unloading the opposing sensor, resulting in a cantilever support of nearly all of the touch force F' through sensor 302. This leads to compressive forces on the near side 302b of the sensor 302, and tensile forces on the far side 302a of the sensor 302, which may be many times the average value of the force value that is desired to be measured.

It is difficult to measure such force distributions 308 accurately, as the portions of the force distribution that are to precisely cancel out may be significantly larger than the signal being measured. If the sensor surfaces are not affixed to the overlay 304 and the support 310, the tensile forces are absent, but the stress distribution 308 close to the near side 302b of the sensor 302 becomes more concentrated. This leads to analogous problems with uniformity of response and dynamic range in the sensor. These problems are reduced, however, if there is rotational softening present at the sensor that reduces the moment passing through the sensor.

Figure 4A:
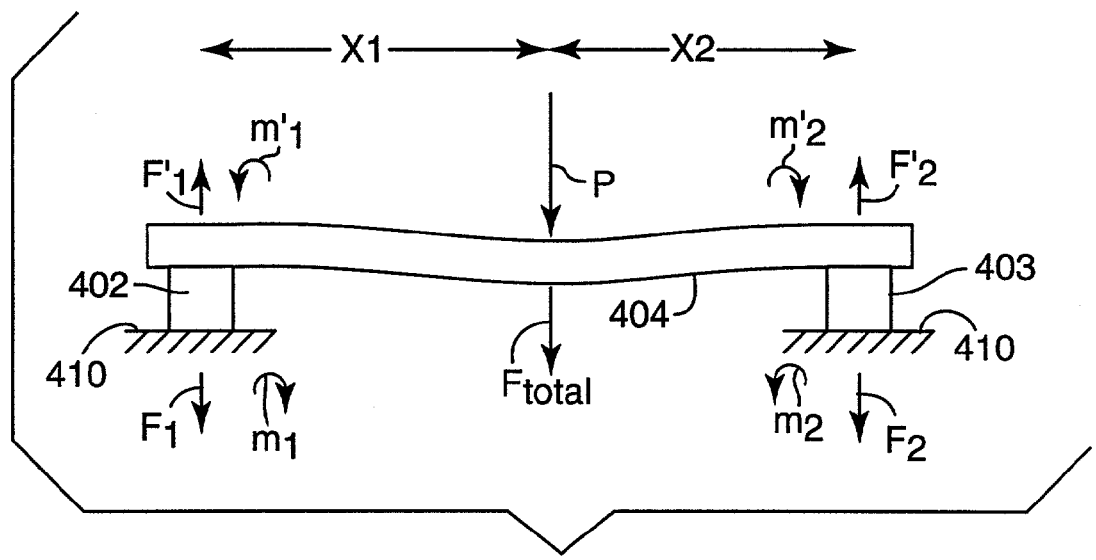
FIG. 4A schematically illustrates the application of forces to force sensors when the sensors are rigidly attached to the overlay and the support structure.

The application of a moment to a sensor is further described with respect to FIG. 4A, which shows an overlay 404 supported between two sensor assemblies 402 and 403. The overlay 404 is pliable in that it is not completely rigid and may flex in response to an applied force, particularly a force applied at a point distant from a support. The sensor assemblies 402 and 403 are rigid: the sensor assemblies may be formed, for example, using a piezoelectric element. The sensor assemblies 402 and 403 transmit both force and moment to the supports 410. The operator presses on the overlay 404 with a force $F_{total}$. A force $F_1$ passes to the support 410 through the first sensor assembly 402 and a force $F_2$ passes through the second sensor assembly 403 to the support 410. In equilibrium, $F_{total}=F_1+F_2$. Reaction forces $F_1'$ $(=-F_1)$ and $F_2'$ $(=-F_2)$ develop moments about point P where the force is applied. Due to the rotational stiffness of the sensors, a moment $m_1$ may pass through the first sensor 402 and a moment $m_2$ may pass through the second sensor 403.

In equilibrium, the moments and forces conform to the condition:

$$F_1 * x_1 - m_1 = F_2 * x_2 - m_2 \quad (1)$$

where $x_1$ is the distance from the first sensor 402 to the point P, and $x_2$ is the distance from the second sensor 403 to the point P. It should be noted that in the equations presented herein, the variables are be represented by their positive magnitudes, although other sign conventions are possible.

Although a straightforward force-sensing touch location device develops no signals directly representative of $m_1$ or $m_2$, these moments do affect the force signal produced by the sensors 402 and 403. Indirect methods of attempting to estimate or correct for these moments may be used, although such methods are complex and difficult to implement. Without implementing such methods, however, location calculations may be subject to serious error.

Figure 4B:
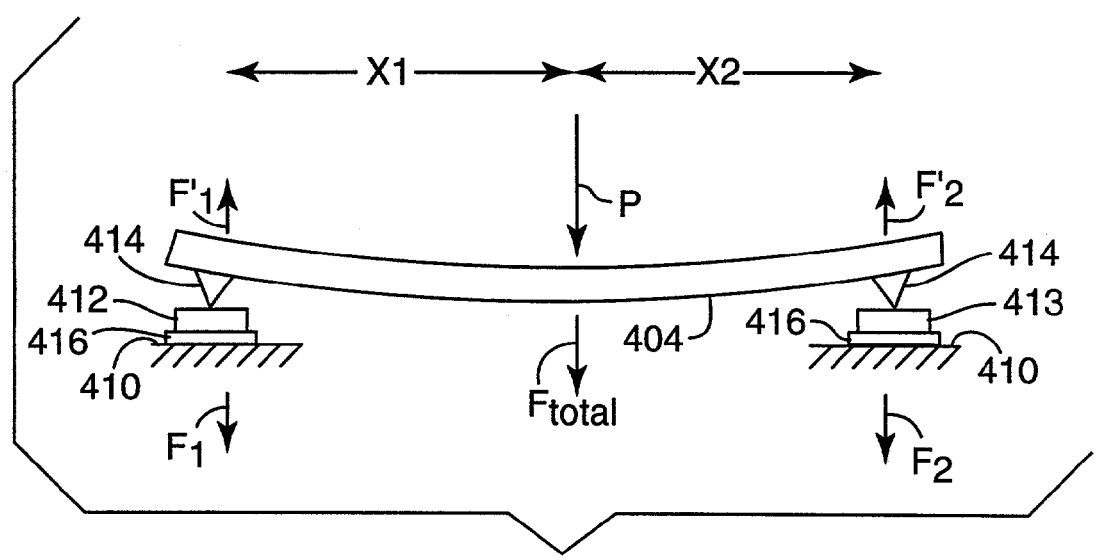
FIG. 4B schematically illustrates the effect of rotational softening when applying force to a flexible overlay, according to an embodiment of the present invention.

Another approach to measuring touch location, that includes rotational softening, is schematically illustrated in FIG. 4B. In this approach, the flexible overlay 404 is supported between two sensors 412 and 413. The sensors may be any type of sensor that detects an applied force, for example, a piezoelectric sensor, capacitive displacement sensor, a piezoresistive sensor or a strain gauge sensor, or the like.

There is a rotationally free bearing 414 between the overlay 404 and each sensor 412 and 413. There may also be a lateral softener 416 between, for example, support 410 and the sensors 412 and 413. The lateral softener 416 may be formed of a material that permits easy lateral elastic motion, so that tangential forces are not transmitted through the sensors 412 and 413 to the support 410. The lateral softener is described further in U.S. patent application Ser. No. 09/835,049.

Application of $F_{total}$ by the user at the point P on the overlay 404 results in forces $F_1$ and $F_2$ being applied through the sensors 412 and 413 respectively to the support 410. Reaction forces $F_1'=-F_1$ and $F_2'=-F_2$ develop moments about point P. Since the rotationally softened sensors assemblies 412 and 413 pass no moments directly, the moments developed by $F_1'$ and $F_2'$ about P must be the total moment about P and, when in equilibrium, this is zero. Thus, we may write the equation:

$$F_1 x_1 = F_2 x_2 \quad (2)$$

Thus, with significant flexibility present in the overlay, the applicability of this simple relation depends upon use of the rotational softening.

Figure 5A:
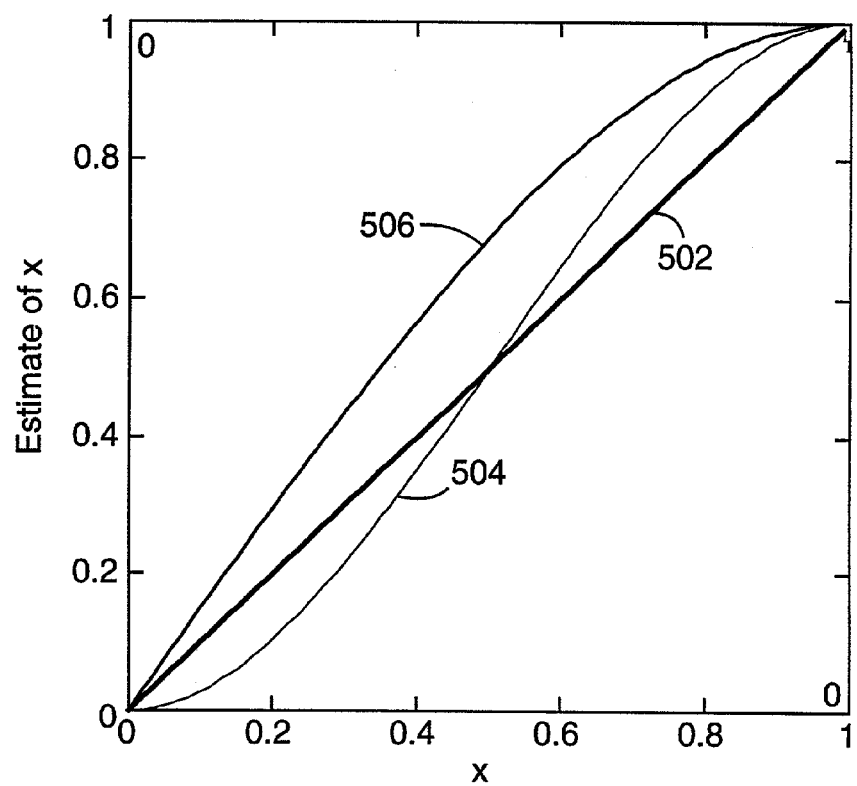
FIGS. 5A and 5B respectively present graphs showing the estimate output from a force measurement system and the error in the output as a function of position across the screen, and for different conditions of rotational softening.
Figure 5B:
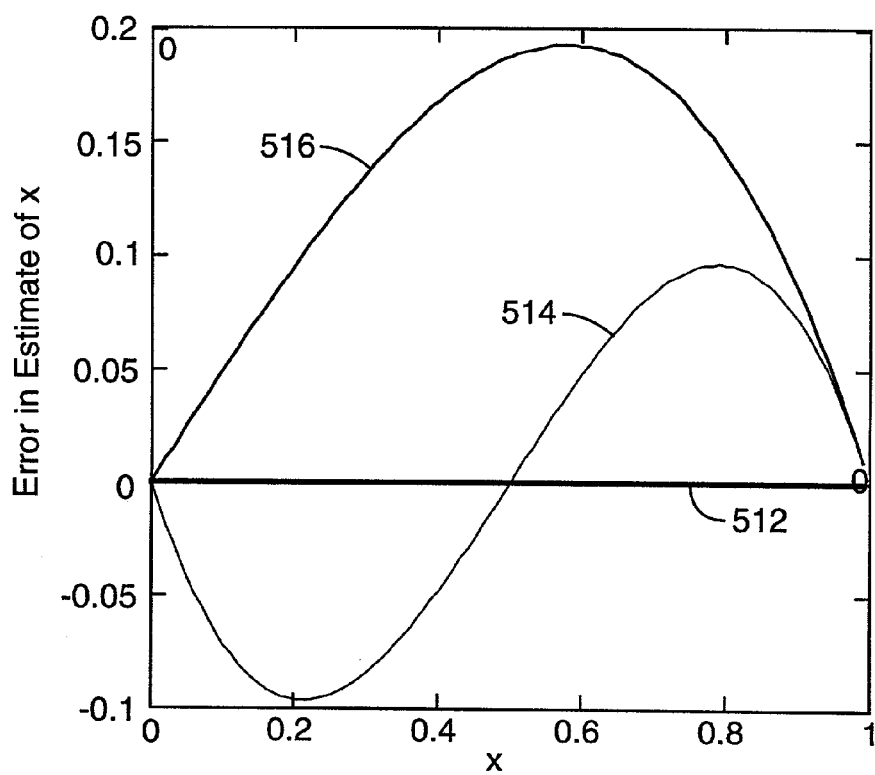

FIGS. 5A and 5B show the performance of various systems, using equation (2) to compute the touch position. The abscissa "x" is defined as the fractional position of the actual point P between the force sensors:

$$x = x1/(x1+x2) \quad (3)$$

In FIG. 5A, the ordinate is the estimate of "x" output by the system. In FIG. 5B, the ordinate is the fractional error in the estimate of "x". The percentage error may be found by multiplying the fractional error by 100.

In each case, the system modeled is a simplification in which the overlay 404 is a member extending between two supporting sensor assemblies. This member is taken to be narrow enough for treatment as a simple beam, and the sensor assemblies are taken to provide either simple or clamped support. As actual touch structures rarely, if ever, deflect by more than half their thickness during operation, the touch deflection may be taken to stay within the beam regime. The member is further taken to be of uniform stiffness along its length. The resulting systems are then readily evaluated.

The output of the case simply supported at both ends is free of error, and is given by the finely dashed line 502 in FIG. 5A. The calculated error is shown in FIG. 5B as curve 512. This corresponds to the flexible overlay configuration of FIG. 4B. This response curve 502 also approximates that of a real system with a sufficiently thick and relatively rigid overlay. Such an overlay overwhelms the rotational stiffness of the sensor connections and underlying support. In the limit of an infinitely stiff overlay, the response curve becomes a fully straight line. Where a rigid overlay connects through rotationally stiff sensors to slightly flexible supports, it is possible for the response curve to be somewhat tipped and shifted. As the curve remains a straight line, however, such potential errors may be removed by commonly practiced calibration or registration techniques.

With a moderately flexible overlay, however, sensors and mountings of ordinary rotational stiffness can lead to large non-linearities of response. Where the sensor stiffness is high compared to that of the overlay, the response obtained is that depicted in the solid curve 504 in FIG. 5A, and the error is depicted as the solid curve 514 in FIG. 5B. Touches close to a sensor are supported through that sensor, much as a diver is supported on a diving board, and the small proportion of force that might be expected at the other sensor is further reduced to nearly zero.

It will be observed that there is very little sensitivity available to differentiate closely spaced touches near a sensor. Thus any attempt at a corrected calculation will face difficulties with noise and precision in these regions.

The broadly dashed curve 506 of FIG. 5A depicts the response of a system in which the left sensor provides simple support, while the right-hand one continues to provide clamped support. From this it is seen that to be helpful, a provision of limited rotational softening must be reasonably well balanced. Softening only one of the two sensors makes error substantially worse, rather than better, as is shown by the corresponding curve 516 in FIG. 5B.

When considering a two-dimensional overlay surface supported on several sensors, for example four sensors, the following differences obtain with regard to the effect of rotationally stiff sensor couplings and a flexible overlay. The position error becomes a complicated function of both X and Y position. The error pattern is further complicated by the existence of a slight downward dimpling of the touch surface around the point of touch contact. Although the majority of the force is transmitted through the nearest sensors, the maximum error may occur at a lower value and for points closer to the sensors. The moment passes outward from the sensor through a cross-section of overlay material that increases in area with increasing radius, and this provides a modest amount of built-in rotational softening for touches farther from the sensors.

Figure 6A:
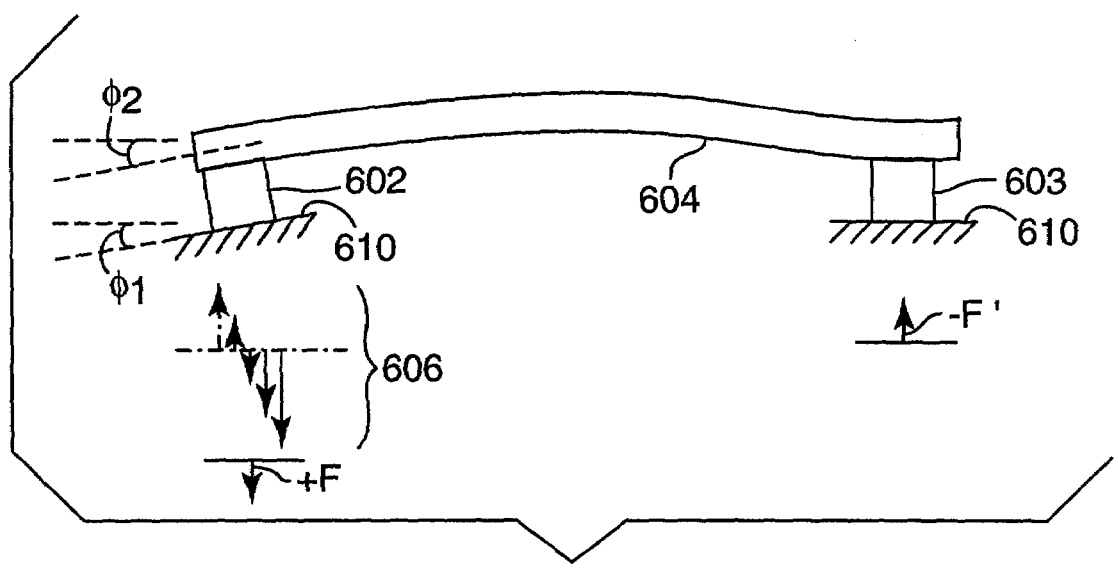
FIG. 6A schematically illustrates twisting of the mounting structure when the force sensor is rigidly clamped between the overlay and the structure.

Another possible source of error in determining the position of a touch is when the sensor mounting structure is itself subject to flexure, in a manner tending to twist one or more sensors. This is schematically illustrated in FIG. 6A. The structure 610 may twist under a sensor when the device housing the touch screen is subject to external forces, for example if the device is gripped firmly in the user's hand, is used in a non-horizontal orientation, or the edge of the device is being pressed on by the user.

In the embodiment illustrated in FIG. 6A, the sensor assembly 602 is assumed to be rotationally stiff relative to the overlay 604. The structure 610 is twisted through an angle ($\phi$1, and the overlay is twisted through an angle $\phi$2 which is approximately the same as $\phi$1.

The rotation of the structure through $\phi$1 causes a moment generated by the associated force distribution 606 in the sensor 602. This moment is balanced by forces +F and −F' seen by the sensors 602 and 603. These forces, F and F' introduce error in the position location of a touch. Since there is likely to be no information in the sensor signals that is predictive of changing rotations of the mountings, the associated errors may be uncorrectable.

Figure 6B:
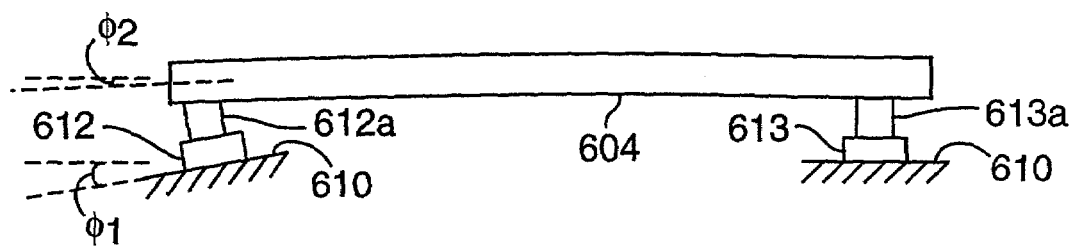
FIG. 6B schematically illustrates twisting of the mounting structure when there is rotational softening between the structure and the overlay, according to an embodiment of the present invention.

In the embodiment illustrated in FIG. 6B, the sensor assemblies 612 and 613 are rotationally soft relative to the overlay 604. The sensor assemblies 612 and 613 may include respective rotational softeners 612a and 613a. Additional examples of rotational softeners are provided below.

When the structure 610 is flexed through an angle $\phi 1$, the resulting angle of the overlay 604, $\phi 2$, is significantly less than $\phi 1$, and so the ratio $\phi 2/\phi 1$ is small. Any residual stiffness in the rotational softener 612 may result in a small non-zero value for $\phi 2$. Errors from enforced mounting rotations will then be reduced by the ratio $\phi/\phi 1$. For some desirable configurations, the touch device manufacturer has little control over the values of $\phi 1$ that may be encountered in applications. In these situations a freely rotating sensing connection may be best. It is important to note that, in this case, increasing the stiffness of the overlay 604 does not reduce error and, in fact may increase the error.

It will be appreciated that smaller ratios of $\phi 2/\phi 1$ are associated with various smaller touch position errors of the sort depicted in FIG. 3. Where such errors are dominant, it may be determined that a flexible overlay may provide sufficient touch location accuracy so long as $\phi 2/\phi 1$ is below a particular value.

One particular example of a rotationally soft sensor is illustrated in FIG. 2. The dimple 240 of the capacitive force sensor 220 is not attached to the overlay 210, and so the overlay 210 may twist relative to the sensor 220 without imparting a moment to the sensor 220.

Figure 7A:
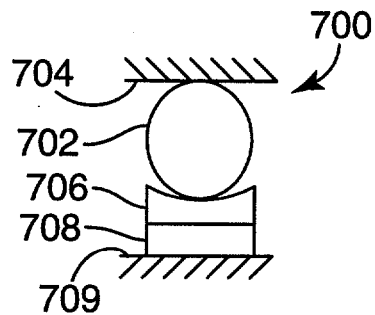
FIGS. 7A–7G schematically illustrate different embodiments of force sensor units that include rotational softening according to the present invention.
Figure 7B:
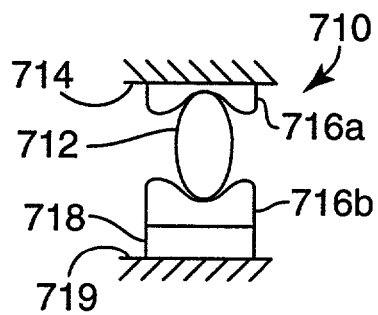
Figure 7C:
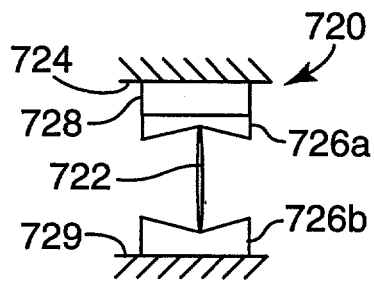

FIGS. 7A–7G illustrate some different approaches to providing rotational softening for a touch sensor. FIGS. 7A–7C schematically illustrate dual-pivoting, rotationally softened sensor units 700, 710, 720. These sensor units may provide lateral softening as well as rotational softening, and may be used in conjunction with lateral stiffeners, described in U.S. patent application Ser. No. 09/835,049.

The first sensor unit 700, illustrated in FIG. 7A, includes a pivoting element 702, or rotational bearing, between the overlay 704 and a force spreader 706 that spreads the applied force to the sensor element 708 and that may be disposed between the spreader 706 and the support 709. The spreader 706 may also act as a receptacle for the pivoting element 702.

The sensor unit 710 includes a first spreader/receptacle 716a attached to the overlay 714 and a second force spreader/receptacle 716b attached to the sensor element 718. The pivoting element 712 is disposed between the two spreader/receptacles 716a and 716b. The sensor element 718 is attached to the support 719.

The sensor unit 720 includes a first spreader/receptacle 726a attached to the sensor element 728. In this particular embodiment, the sensor element 728 is disposed between the spreader/receptacle 726a and the overlay 724. The second force spreader/receptacle 726b is mounted to the support 729. The pivoting element 722 is disposed between the two spreader/receptacles 726a and 726b.

The illustrations show the sensor units 700, 710 and 720 employing progressively narrower pivoting elements 702, 712 and 722, and progressively smaller contact radii, although this need not be the case. A pivoting element with a narrower aspect may be more compact in some assemblies, and a smaller contact radius may offer less opportunity for contaminant particles to affect smooth operation.

The pivoting elements 702, 712 and 722 may be formed from a relatively hard material that does not significantly deform under the pressure that maintains the overlay with the structure. The pivoting elements 702, 712 and 722 may be formed, for example, using metal, glass or a hard polymer. Likewise, the receptacles 706, 716a, 716b, 726a and 726b may be formed from a material that does not significantly deform under pressure, and may be formed from metal, glass or polymer. If the material for the pivoting element or receptacle deforms significantly under pressure, then the surface area of the contact increases, thereby reducing the rotational softening effect.

FIGS. 7D–7G schematically illustrate different types of rotationally softened sensor units that may be affixed to both the overlay and the mounting structure. These sensor units typically entail flexure of material arranged to offer substantial rotational compliance.

Figure 7D:
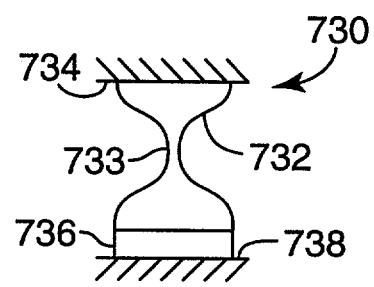

The sensor unit 730 illustrated in FIG. 7D uses a coupling block 732 of material disposed between overlay 734 and the sensor element 736. The sensor element 736 is mounted to the support 738. The coupling block 732 has a narrowed aspect 733, which permits rotation of the end of the block 732 mounted to the overlay 734 relative to the end of the block 732 mourned to the sensor element 736. Depending on the thickness of the narrowing in the coupling block 732 and the required degree of rotational softening, the block 732 may be formed from a material having a relatively high Young's modulus. For example, the coupling block 732 may be a piece of material, such as metal or hard plastic, that is pinched down to form a waist 733, or that has been twisted to form the waist 733.

Figure 7E:
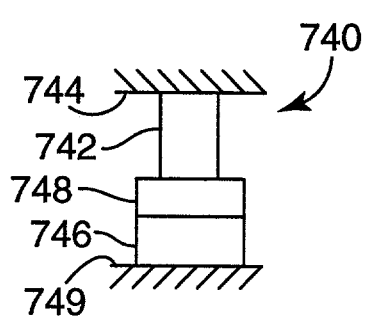

The sensor unit 740 illustrated in FIG. 7E includes a sensor element 746 mounted to the structure 749, and a coupling block 742 of low modulus material, for example an elastomeric material, mounted to the overlay 744. The coupling block 742 may have a more moderate aspect ratio than the coupling block 732 illustrated in FIG. 7D. The coupling block 742 may be mounted directly to the sensor element 746, or may be mounted to the sensor element 746 via a force spreader 748 as illustrated. In this particular embodiment, the sensor element 747 is mounted directly to the support 749.

Figure 7F:
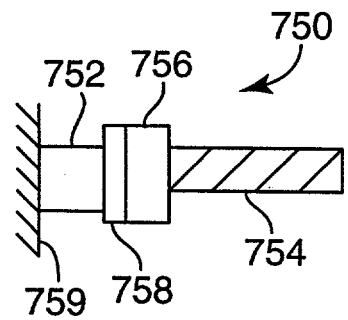

The sensor unit 750 illustrated in FIG. 7F includes a sensor element 756 that responds to a force passed in shear, rather than compression. The sensor element 756 may be attached directly to the overlay 754. A coupling block 752 of low modulus material, for example an elastomer, may be is connected to the sidewall 759 of the support structure. The coupling block 752 may be attached directly to the sensor element 756, or to the sensor element 756 via a force spreader 758.

It will be appreciated that the order of the elements in the sensor unit need not be as illustrated. For example, the sensor unit 746 in FIG. 7E may be attached to the overlay 744, while the coupling block 742 is attached to the structure 749. Generally, coupling blocks have lower rotational stiffness when they are smaller, have a more slender aspect, and/or are formed of a material having a lower Young's modulus.

Figure 7G:
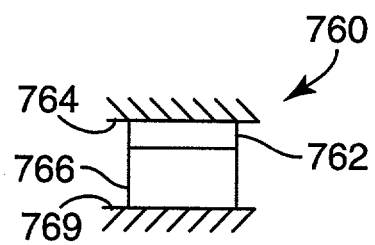

The sensor unit 760 illustrated in FIG. 7G uses a relatively thin layer of a highly compressible material, such as an open-cell or closed-cell foam, to serve as rotationally softening, coupling block 762. The coupling block is mounted to the overlay 764 and the sensor element 766. The sensor element 766 is mounted to the support 769.

The compressibility of the air in the foam of the coupling block 762 avoids one difficulty that may arise when the coupling block material is trapped between two rigid surfaces. When one of the surfaces rotates relative to the other, the material at one end of the block is compressed and tends to flow with severe shear. This is because non-porous, low Young's modulus materials are generally isovolumic and have a Poisson's ratio of about 0.5. The reverse problem occurs for material at that portion where the block is in tension, pulled between the two surfaces that have separated.

The net effect is for stiffness to increase dramatically as the block thins, until the compliance is essentially only that provided by the bulk modulus.

Another approach to decoupling the sensor from moments applied by the overlay and the structure is to use a sensor having a small point of contact that is not attached to the opposing surface. For example, in FIG. 2, the dimple 240 is in contact, but not attached to, the overlay 210. It will be appreciated that the small point of contact may also contact the structure, rather than the overlay.

Figure 8A:
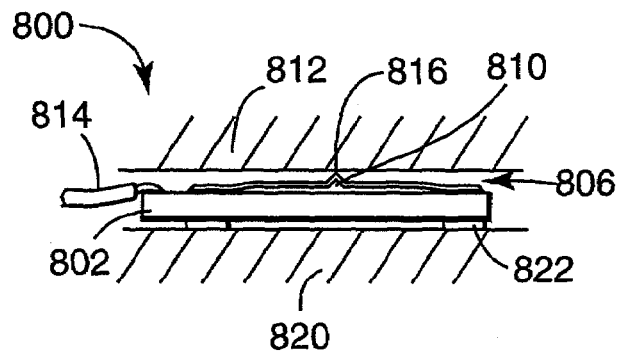
FIGS. 8A and 8B schematically illustrate another embodiment of a capacitive force sensor that includes rotational softening according to the present invention.
Figure 8B:
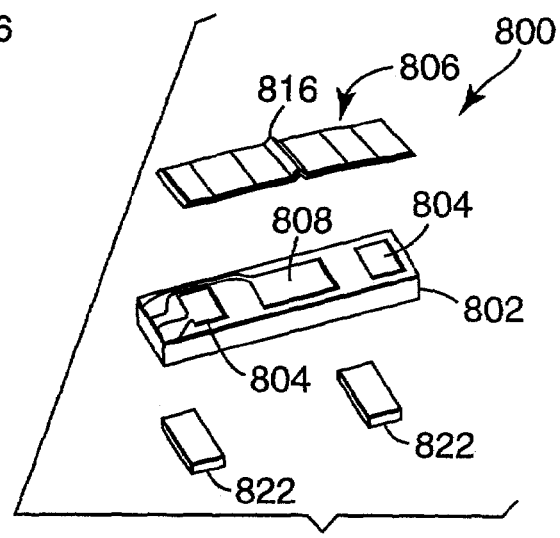

Additional embodiments of capacitive force sensors that provide rotational softening are now described. Referring first to FIGS. 8A and 8B, one particular embodiment of a force sensor 800 is formed from a substantially planar support member 802. An electrode pattern is formed on the support member 802 that includes one or more first electrodes 804 that connect to the spring member 806, and at least a second electrode 808. The spring member 806 is preferably mechanically resilient and electrically conductive. For example, the spring member may be formed from a metal or from a conductively coated insulator, such as a plastic. The support member 802 may be mounted to the underlying support structure 820 using any suitable method. For example, the support member 802 may be mounted using an acrylic tape 822 so as to provide lateral softening and flexural isolation.

A capacitive gap 810 is formed between the spring member 806 and the second electrode 808. One approach to forming the gap is to shape the spring member 806 with a slight offset at each end, as shown. In another approach, the spring member 806 may be formed without such offsets, and the gap 810 may be established by spacing the spring member 806 from the second electrode 808 with a temporary shim, then reflowing the connections between the first electrodes 804 and the spring member 806 with solder. In another approach, the gap 810 may be formed using a solder that contains particles of a particular size so as to space the spring member 806 from the first electrodes 804.

When the spring member 806 is depressed under a force to the overlay 812, the width of the gap 810 is reduced, thus changing the capacitance measured between the first and second electrodes 804 and 808. Discrete wiring 814 provides electrical connection between the touch controller circuit and the electrodes 804 and 808 to permit measurement of the capacitance of the sensor 800.

The spring member is provided with a pivoted force bearing 816 in the form of a ridge. This structure advantageously provides good strength against extreme overloads.

In one particular example, the spring member 806 may be formed from spring steel and may be approximately 250 μm thick (10 mils) and about 6 mm wide (0.25"). The spring member may be about 17 mm long (0.75") and pressed into shape on a die. The capacitive gap 810 may be about 125 μm (5 mils). The support member 802 may be formed from any suitable material, such as an epoxy glass PC board. The support member 802 is typically of sufficient stiffness that a lateral softener, such as the acrylic tape 822 may be positioned between the support member 802 and the structure 820. The unloaded capacitance of such a structure is around 3 pF and the bottoming-out force is between about four and five pounds. It will be appreciated that the dimensions and particular materials are provided for illustration only and should not be taken as being limiting in any way. The dimensions of the sensor components should be selected based on the characteristics of the particular touch device being constructed.

This structure provides an advantage in that, should the structure 820 flex, the resulting curvature is poorly transmitted to the support member 802, thus reducing the effect that enclosure forces have on the measured forces.

Figure 9A:
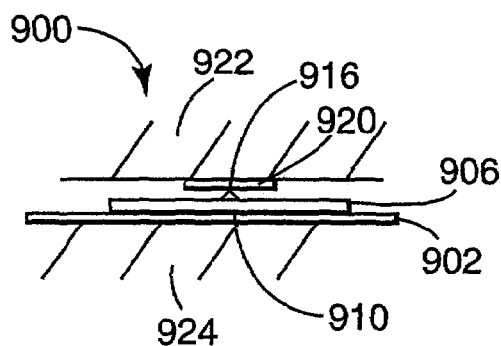
FIGS. 9A and 9B schematically illustrate another embodiment of a capacitive force sensor that includes rotational softening according to the present invention.
Figure 9B:
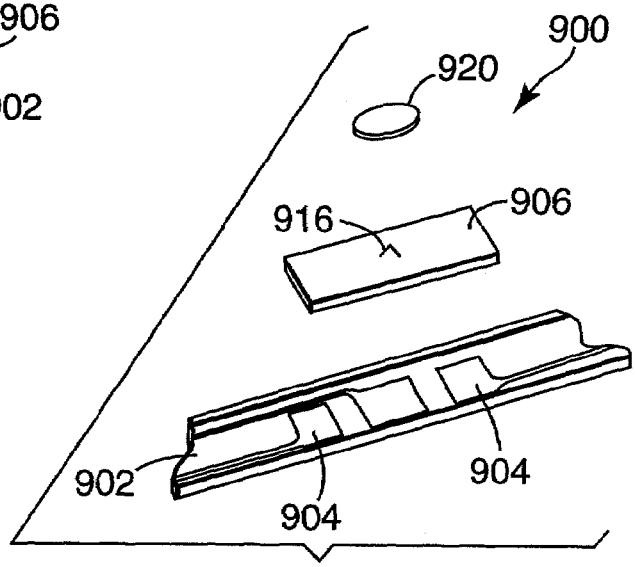

Referring now to FIGS. 9A and 9B, another embodiment 900 of a capacitive sensor includes a spring member 906 formed with an outwardly protruding dimple 916. FIG. 9A schematically illustrates the sensor 900 in situ, while FIG. 9B provides an exploded view of the sensor 900.

The spring member 906 is mounted on a support 902 that is provided with an electrode pattern including one or more first electrodes 904 and a second electrode 908. The spring member 906 is connected to, and spaced from, the first electrodes 904, for example using a technique similar to one of those described above with respect to sensor 800. A capacitive gap 910 is formed between the spring member 906 and the second electrode 908. A lateral softener 920 may be placed between the dimple 916 and the overlay 922 to provide lateral softening. The support member 902 is mounted on the structure 924.

In one particular example of the sensor 900, the spring member 906 is formed from spring steel 150 μm (6 mils) thick and is almost 6 mm (230 mils) long and about 3 mm (120 mils) wide. The spring member 906 may also be made from other materials and with different thicknesses. For example, the spring member 906 may be formed from phosphor-bronze that is 200 μm (8 mils) thick. The capacitive gap 910 may be 25 μm (1 mil) high. The bearing dimple 916 may be formed using a spring loaded center punch while the spring member 906 is pressed against a relatively deformable backing, such as aluminum. The free span of the spring member may be about 3.75 mm (150 mils), the central 2.15 mm (86 mils) of which opposes the second electrode 908. The unloaded capacitance of the sensor 900 is about three pF, and the bottoming-out force is between about three and four pounds.

Capacitive force sensors exhibit a change in capacitive reactance as a function of a change in applied force. For the sensors 800 and 900, this change is substantially linear for smaller forces, where the relative gap change is small. With larger forces, however, the center of the capacitive region closes up while the edges remain more widely spaced; this leads to a nonlinear drop in reactance that becomes more rapid than linear. Compensation for this nonlinear response characteristic may be accomplished in the processing of the sensor signal. In another approach, varied embodiments of the capacitive sensor may be provided which have an inherently greater range of linear reactance change. Thus, a capacitive force sensor having a nonuniform gap may provide improved linearity of measurement with simple processing of the signal, even where one or more capacitor plates are flexing in response to applied force.

One particular embodiment of a capacitive sensor with an extended linear response range is schematically illustrated in FIG. 10. The dimensions in the vertical direction are exaggerated in the figure so as to more clearly illustrate the sensor 1000. The sensor 1000 has a spring member 1006 that is provided with a controlled shape having a slight bend. The bend permits the ends 1006a and 1006b of the spring member 1006 to attach to the first electrodes 1004 with a minimal solder film while the center portion 1006c provides a maximum capacitive gap 1010 relative to the second electrode 1008. The first and second electrodes 1004 and 1008 are formed on the support 1002. There is a level of force that may be applied to the coupling 1014 which is just sufficient to first bring the spring member 1006 into contact with the second electrode 1008. The tapering of the capacitive gap 1010 between the spring member 1006 and the second electrode 1008 may be so shaped that contact tends to happen simultaneously at a number of points along the second electrode 1008. This reduces the nonlinearity of the sensor's response. Such a sensor is described in greater detail in U.S. patent application Ser. No. 09/835,040.

The spring member of the capacitive force sensor need not be rectangular as illustrated in FIGS. 8B and 9B, and need not be formed with uniform thickness. For example, the spring member may be shaped so that flexure is concentrated in specifically desired areas not serving as capacitor plates. This reduces flexure in the capacitive areas, thus increasing the linearity of the reactance change. Additional shapes and forms for the spring member are discussed further in U.S. patent application Ser. No. 09/835,040.

Capacitive sensors may be formed using a spring member made from an insulating material that is conductively coated in a certain area or areas, one particular example of such a sensor 1100 is described with reference to FIGS. 11A–11C. A region of material 1102, for example, epoxy glass PC board, forms a principal element 1106. The principal element 1106 includes lands 1107 and 1108, and such portions of the epoxy glass substrate as store significant elastic energy associated with changes in the capacitive gap.

As may be seen more clearly from the schematic cross-sectional view provided in FIG. 11B, a predefined path carries applied force from an overlay 1114, through a force-coupling elastomeric pad 1116, upper capacitor plate 1118, and spacing/connecting solder film 1120, to the central region 1122 of the principal element 1106. The central region 1122 is flanked by slots 1124 which serve both to increase and to relatively localize the flexure in the PC substrate. The force passes both out and around the ends of the slots 1124, eventually reaching the supports 1126. As force passes away from the immediate vicinity of the capacitive area and the slots 1124, any additional flexure ceases to relate to force-induced changes in the capacitive gap, and so is no longer passing through the force sensor. The supports 1126 are mounted to the structure 1128.

If present, supports 1126 placed close to the sensor may have some effect upon sensitivity and symmetry of response. Such close supports may be given a symmetrical disposition, such as that shown, not excessively close to central region 1122. More remote supports may be placed in any pattern desired.

The elastomeric pad 1116 provides both lateral softening and rotational softening. As such, the pad 1116 may provide the function of the dimple 914 and the lateral softener 920. The 1116 may be fastened adhesively to the capacitor plate 1118 below, but not attached above. Structures above the sensor 1100, such as the overlay 1126, may then be aligned and preloaded. In another approach, the pad 1116 offers the possibility of maintaining alignment and assembly through adhesive attachments both above and below.

Another embodiment 1150, schematically illustrated in FIG. 15C, shows an altered force path that passes through the length of the upper capacitor plate 1118. This upper plate 1118 may now make a significant contribution to the elastic energy storage associated with the capacitive gap; in which case, it is appropriate to view the upper plate 1118 as an additional spring member 1106*a*, working in concert with the lower principal element 1106, or spring member. Force passes from the spring member 1106*a* through the solder 1130 into the lower spring element 1106, continues around slots 1124, into central region 1122, and thence to support 1152.

It will be appreciated that many variations on the capacitive force sensor of the invention are possible. These are discussed further in U.S. patent application Ser. No. 09/835,040. One example of a variation of the embodiments discussed herein is that the pivot point may be attached to the under side of the overlay, rather than to the spring member of the force sensor. In another variation, the sensor may be mounted to the under side of the overlay, with the pivot contacted to the support surface.

As noted above, the present invention is applicable to touch sensors and is believed to be particularly useful for touch sensors that rely on the measurement of the force applied to the touch sensor. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. A device for determining the location of a touch on a touch screen, comprising:
   a flexible touch member movable in response to the touch;
   a support structure;
   a plurality of sensor units coupled between the support structure and the touch member at respective sensor regions of the touch member, each sensor unit measuring a signal indicative of a force due to the touch that is passed through each respective sensor region, wherein the signal measurements by each sensor unit are used to determine a position of the touch on the touch screen, and at least a first sensor unit of the plurality of force sensor units being arranged so that twisting of one of the touch member and the support structure passes substantially no moment through the first sensor unit.

2. A device as recited in claim 1, wherein the first sensor unit couples to the touch member at a position between the support structure and a touch plane of the touch member.

3. A device as recited in claim 1, wherein the touch member is rotatable relative to the support structure about a rotation axis proximate the first sensor unit.

4. A device as recited in claim 3, wherein the rotation axis is positioned below the touch member.

5. A device as recited in claim 3, wherein the rotation axis is positioned closer to a center of the first sensor unit than to a touch surface of the touch member.

6. A device as recited in claim 1, wherein the sensor unit includes a rotational bearing coupled between the touch member and the support structure to allow relative rotation between the touch member and the support structure.

7. A device as recited in claim 6, wherein the sensor unit further includes at least one receptacle to maintain a lateral position of the rotational bearing.

8. A device as recited in claim 6, further comprising a force spreader disposed between the rotational bearing and a force sensing element to spread the force received through the rotational bearing on the force sensing element.

9. A device as recited in claim 1, wherein the sensor unit includes a coupling having a narrowed portion that permits rotation of one part of the coupling on a first side of the narrowed portion relative to a second part of the coupling, on a second side of the narrowed portion.

10. A device as recited in claim 1, wherein the sensor unit includes a coupling of low modulus material.

11. A device as recited in claim 10, wherein the coupling of low modulus material is formed from an elastomer.

12. A device as recited in claim 10, wherein the coupling of low modulus is a foam.

13. A device as recited in claim 1, wherein the sensor unit includes a sensing element that is responsive to shear, a line of force between the touch member and the support structure being substantially parallel to a touch plane of the touch member.

14. A device as recited in claim 1, wherein at least one of the plurality of sensor units includes a capacitive force sensing element.

15. A device as recited in claim 14, wherein the capacitive force sensing element includes a spring member separated from an electrode by a gap separation, the extent of the gap separation being dependent on a magnitude of a force applied through the sensor unit.

16. A device as recited in claim 14, wherein the capacitive force sensing element includes a bearing that is rotationally free in at least one direction.

17. A device as recited in claim 16, wherein the bearing is a protruding portion of a spring member of the capacitive force sensing element.

18. A device as recited in claim 1, further comprising a lateral softener disposed on a force path that transmits force through at least one of the sensor units from the touch member to the support structure.

19. A device as recited in claim 1, further comprising a display unit disposed below the touch member to display an image through the touch member.

20. A device as recited in claim 19, further comprising a processing unit coupled to display information via the display unit and receive information via the plurality of sensor units.

21. A device as recited in claim 1, wherein the touch member includes a display unit.

22. A method of locating a touch on a flexible touch surface, comprising:
measuring a signal indicative of a force passing through a sensor unit due the touch while isolating a twisting moment of one of the touch surface and a support structure from the other of the touch surface and the support structure; and
determining the location of the touch on the touch surface using the measured signal.

23. A method as recited in claim 22, wherein isolating the twisting moment includes isolating the twisting moment with a rotational bearing.

24. A method as recited in claim 23, further comprising constraining lateral movement of the rotational bearing.

25. A method as recited in claim 23, further comprising laterally spreading a force received through the rotational bearing.

26. A method as recited in claim 22, wherein isolating the twisting moment includes bending a coupling at a narrowed portion of the coupling.

27. A method as recited in claim 22, wherein isolating the twisting moment includes deforming a bearing formed from a low modulus material.

28. A method as recited in claim 27, wherein the low modulus material is an elastomer.

29. A method as recited in claim 27, wherein the low modulus material is a foam.

30. A method as recited in claim 22, wherein sensing the movement of the touch screen includes shearing a sensing element in the sensor unit.

31. A method as recited in claim 22, wherein measuring a signal indicative of the force passing through the sensor unit due to the touch includes compressing a sensing element in the sensor unit.

32. A method as recited in claim 22, wherein measuring a signal indicative of the force passing through the sensor unit due to the touch includes moving a first conductive surface of a capacitor relative to a second conductive surface of the capacitor and measuring a change in capacitance.

33. A method as recited in claim 22, further comprising permitting the touch surface to move laterally relative to the sensor unit.

34. A method as recited in claim 22, wherein the measured signal is derived from a displacement in the sensor unit.

35. A method as recited in claim 22, further comprising displaying an image through the flexible touch screen.

36. A method as recited in claim 22, wherein the flexible touch screen includes an image display device, and further comprising displaying an image using the image display device.

37. A touch sensitive device for locating the position of a touch force, comprising;
a flexible touch member;
means for measuring signals indicative of forces passing through sensor regions arising from displacement of the touch member relative to a support due to the touch force;
means for isolating a twisting moment at the sensor regions of one of the touch member and the support from the other of the touch member and the support; and
means for determining the position of the touch force on the touch member based on the measured signals.

38. A touch sensitive device for locating the position of a touch, comprising:
a flexible touch member movable in response to an applied force;
a support structure;
a plurality of sensor units coupled between the support structure and the touch member at respective sensor regions of the touch member, the sensor units measuring a signal indicative of a force due to the touch that is passed through the sensor regions, wherein the signal measurements by the sensor units are used to determine a position of the touch on the touch screen, and wherein substantially the same relative pattern of internal stresses being developed in a first sensor unit of the plurality of sensor units irrespective of a location of the touch upon the touch member.

39. A device as recited in claim 38, wherein the first sensor unit couples to the touch member at a position between the support structure and a touch plane of the touch member.

40. A device as recited in claim 38, wherein the touch member is rotatable relative to the support structure about a rotation axis proximate the first sensor unit.

41. A device as recited in claim 38, wherein at least one of the sensor units includes a rotational bearing coupled between the touch member and the support structure to allow relative rotation between the touch member and the support structure.

42. A device as recited in claim 41, wherein the at least one of the sensor units further includes at least one receptacle to maintain a lateral position of the rotational bearing.

43. A device as recited in claim 38, wherein at least one of the sensor units includes a coupling having a narrowed portion that permits rotation of one part of the coupling on a first side of the narrowed portion relative to a second part of the coupling on a second side of the narrowed portion.

44. A device as recited in claim 38, wherein at least one of the sensor units includes a coupling of low modulus material.

45. A device as recited in claim 38, wherein at least one of the sensor units includes a sensing element that is responsive to shear, a line of force between the touch member and the support structure being substantially parallel to a touch plane of the touch member.

46. A device as recited in claim 38, wherein at least one of the sensor units includes a capacitive force sensing element.

47. A device as recited in claim 46, wherein the capacitive force sensing element includes a spring member separated from an electrode by a gap separation, the extent of the gap separation being dependent on a magnitude of a force applied through the sensor unit.

48. A device as recited in claim 47, wherein the spring member includes a protruding portion to form a rotational bearing.

49. A device as recited in claim 38, further comprising a display unit disposed below the touch member to display an image through the touch member.

50. A device as recited in claim 49, further comprising a processing unit coupled to display information via the display unit and receive information via the plurality of force sensor units.

51. A device as recited in claim 38, wherein the touch member includes a display unit.

* * * * *